Sept. 8, 1959 C. VRANA 2,903,034
VENTILATED FOOD RECEPTACLE AND COVER
Filed July 2, 1956

INVENTOR.
CHARLES VRANA
BY Carl Miller
ATTORNEY

2,903,034

VENTILATED FOOD RECEPTACLE AND COVER

Charles Vrana, Paterson, N.J.

Application July 2, 1956, Serial No. 595,169

3 Claims. (Cl. 150—52)

This invention relates to a removable, pliable cover for food receptacles which may also be used as a self contained food receptacle, such as for foods to be frozen.

An important object of the present invention is that the design of the cover or receptacle is simple and economical to manufacture.

This device is constructed of pliable material, has an expansible neck opening for accommodating a variety of different receptacles of different sizes, and has self contained means for applying, adjusting, and removing the cover during use. In addition, the unit has ventilating means for circulating air in the vicinity of the food to better condition it for storage in a refrigerator.

When used as a food receptacle, such as for foods to be frozen, the present device will accommodate a full load, while the elastic neck will retain the contents therewithin. At the same time, the self contained means for facilitating the application, adjustment, and removal of the device serves as a cover for enclosing the contents of the food at the neck opening.

Ordinarily, prepared foods or left over foods are stored in a refrigerator in some sort of a container. If the food is left uncovered, foreign matter from upper shelves can drop into it and, if the food is covered for any length of time without proper air circulation, such food may quickly deteriorate. However, when covered with a cover having means for admitting air, the deterioration of the food is retarded considerably. Such air circulating means is provided in the present invention on the sides of the closure device so that no sacrifice in the size of the opening is made, while foreign matter is prevented from dropping into the top thereof.

The self contained means for facilitating the application, adjustment of, and removal of the present device is in the form of tabs folded over at each corner of a rectangular sheet of material, as will be hereinafter more fully described.

All of the foregoing and still further objects and advantages of this invention will become apparent from a study of the following specification, taken in connection with the accompanying drawing, wherein.

Figure 1:
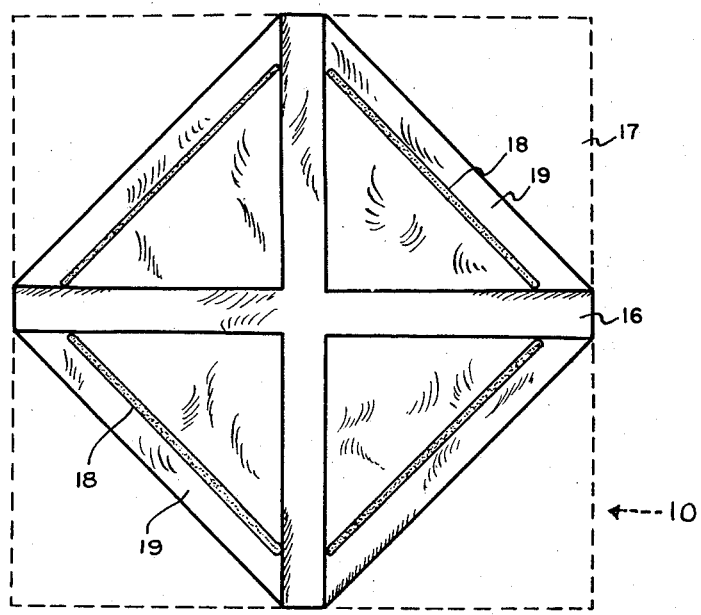
Figure 1 is a plan view of a cover or receptacle made in accordance with the present invention, showing the same opened out flat with the corners folded over and heat welded to form seams through which an elastic member may be inserted.

Referring now to the drawing, and more particularly to Figure 1 thereof, a combined receptacle and cover 10 made in accordance with the present invention is shown to include a substantially square piece of flexible material 17 having each corner thereof folded back upon the central portion of the sheet. These corners are secured in such folded back position by means of heat welds 18 which also define tubular passageways 19 through which an elastic ring or band 12 may be threaded. It will be noted that the adjacent edges of adjacent corner tabs 15 are sufficiently spaced apart to define air spaces 16 through which air may circulate during actual use of the device.

Figures 2, 3:
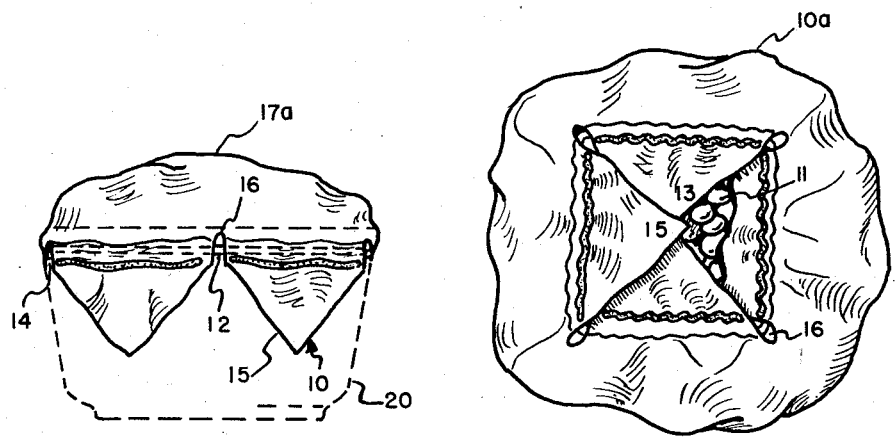
Figure 2 is a top plan view of the device shown in Figure 1, with an elastic member threaded through the seams in operative use as a receptacle.
Figure 3 is a side elevational view of the device shown in Figure 2 in operative use as a receptacle cover.

When using this device as a food receptacle, such as indicated at 10a in Figure 2 of the drawing, the corner tabs 15 become flaps 13 that close over the top of the opening yieldably urged toward a closed position by the elastic ring 12 extending through the tubular passageways 19 formed by the heat welds 18. At the same time, the spaces 16 provide air passageways through which air can circulate through the food 11 contained within the receptacle.

In Figure 3 of the drawing, the device 10 is shown in actual use as a receptacle cover 17a in which the corner tabs 15 facilitate the application, adjustment, and removal of the unit relative to the receptacle 20. In this function of the device, the spaces 16 also provide air passageways through which air can be circulated through the food and interior of the receptacle 20 to retard spoilage.

It will be recognized that in all applications of the present invention, the elastic ring or band 12 serves to constrict the circular opening through which food may be inserted into the receptacle or such closure may be applied to a food storage receptacle as a cover. In all cases, however, the spacing between the adjacent edges of the corner flaps provides the air spaces 16 which accommodate the passage of air therethrough.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A closure comprising, in combination, a square sheet of pliable material defining four spaced apart corners, each corner being folded back upon itself to define a peripheral housing, an endless elastic ring within said housing, said endless elastic ring normally drawing said folded back corners radially inwardly in spaced substantially parallel relationship with the central portion of said sheet and defining an expansible opening communicating with the space therebetween, and said corners defining pull tabs for adjusting said closure over an object to be stored.

2. A closure as set forth in claim 1, wherein said central portion of said sheet comprises a top wall, and further comprising air vents to define intermediate adjacent ones of said pull tabs and said top wall.

3. A closure as set forth in claim 1, wherein said central portion of said sheet comprises an upwardly opening receptacle, and said corners overlie said central portion of said sheet defining an access opening communicating with the interior of said receptacle.

References Cited in the file of this patent

UNITED STATES PATENTS

| | | |
|---|---|---|
| 1,206,041 | Slataper | Nov. 28, 1916 |
| 1,471,729 | Guinzburg | Oct. 23, 1923 |
| 2,479,203 | Brown | Aug. 16, 1949 |
| 2,656,769 | Hultkrans | Oct. 27, 1953 |
| 2,731,997 | Muth et al. | Jan. 24, 1956 |
| 2,766,797 | Cowen | Oct. 16, 1956 |

FOREIGN PATENTS

| | | |
|---|---|---|
| 997,501 | France | Sept. 12, 1951 |